(12) United States Patent
Damola et al.

(10) Patent No.: US 7,881,338 B2
(45) Date of Patent: Feb. 1, 2011

(54) HANDLING QUALITY OF SERVICE IN A COMMUNICATION SYSTEM

(75) Inventors: Ayodele Damola, Kista (SE); Johan Kölhi, Vaxholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 417 days.

(21) Appl. No.: 12/090,804

(22) PCT Filed: Oct. 21, 2005

(86) PCT No.: PCT/EP2005/055470

§ 371 (c)(1), (2), (4) Date: Apr. 18, 2008

(87) PCT Pub. No.: WO2007/045278

PCT Pub. Date: Apr. 26, 2007

(65) Prior Publication Data

US 2008/0291930 A1   Nov. 27, 2008

(51) Int. Cl.
*H04L 12/66* (2006.01)
(52) U.S. Cl. .......... 370/466; 370/469; 709/228
(58) Field of Classification Search .......... 379/229, 379/230, 231, 235, 252, 389, 392, 400, 401, 379/465–467, 469; 709/227–229, 237
See application file for complete search history.

(56) References Cited

U.S. PATENT DOCUMENTS

| 6,888,821 B2 * | 5/2005 | Rasanen et al. ............ 370/352 |
| 7,649,881 B2 * | 1/2010 | Casey ........................ 370/389 |
| 2004/0190498 A1 * | 9/2004 | Kallio et al. ............... 370/352 |
| 2006/0221829 A1 * | 10/2006 | Holmstrom et al. ......... 370/230 |
| 2007/0002832 A1 * | 1/2007 | Sylvain ..................... 370/352 |
| 2007/0195805 A1 * | 8/2007 | Lindgren .................... 370/401 |

FOREIGN PATENT DOCUMENTS

WO   WO 2004/040777 A   5/2004

* cited by examiner

*Primary Examiner* — Pankaj Kumar
*Assistant Examiner* — Duc T Duong

(57) ABSTRACT

A method of providing a selected Quality of Service for calls traversing an IP Multimedia Subsystem. A control-plane Home IP Multimedia Gateway is interposed between the IP Multimedia Subsystem and at least one non-SIP client, such that SIP signaling may be exchanged with a remote client on behalf of the at least one non-SIP client. The Home IP Multimedia Gateway identifies a Quality of Service type by reference to the SDP part of one or more SIP messages, and the call leg between the non-SIP client and a residential gateway is configured accordingly.

10 Claims, 1 Drawing Sheet

US 7,881,338 B2

HANDLING QUALITY OF SERVICE IN A COMMUNICATION SYSTEM

FIELD OF THE INVENTION

The present invention relates to the handling of Quality of Service issues in a communications network and is applicable in particular to ensuring quality of service interoperability between two or more networks, one of which is an IP Multimedia Subsystem Core Network.

BACKGROUND TO THE INVENTION

IP Multimedia (IPMM) services provide a dynamic combination of voice, video, messaging, data, etc. within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over 3G mobile communication networks (3GPP TS 23.228 and TS 24.229 Release 5 and Release 6). IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and web servers). The Session Description Protocol (SDP), carried by SIP signalling, is used to describe and negotiate the media components of the session. Others protocols are used for media transmission and control, such as Real-time Transport Protocol and Real-time Transport Control Protocol (RTP/RTCP), Message Session Relay Protocol (MSRP), Hyper Text Transfer Protocol (HTTP).

IMS requires an access network which would typically be a 2G/3G General Packet Radio Service (GPRS)/Packet Switched (PS) network, but which might be some other access network such as fixed broadband or WiFi. FIG. 1 illustrates schematically how the IMS fits into the mobile network architecture in the case of a GPRS/PS access network.

The TISPAN working group of the European Telecommunications Standards Institute (ETSI) is currently working on a proposal for the Next Generation Network (NGN) for fixed networks based upon IMS. As part of this project, consideration will be given to a so-called Home IMS Gateway (HIG) which will allow non-IMS terminals to access IMS services. It is expected that the HIG will find applications in the home and small office environments where users might wish to access IMS services using a number of non-IMS enabled terminals which may or may not be SIP terminals. Examples of non-IMS but SIP enabled terminals are SIP telephones and PCs, whilst examples of non-IMS terminals which do not have SIP functionality are legacy telephones including DECT telephones and IP device with UPnP support. The HIG will include a SIP gateway in order to handle interoperability issues (e.g. conversion between SIP and other signalling protocols required by user equipment). Of course, alternatives to the TISPAN HIG proposal may well emerge in the future.

SUMMARY OF THE INVENTION

The new IMS based advanced multimedia services will impose high demands on the Quality of Service (QoS) characteristics end-to-end, from the server in the operator network all the way into and through the "home" network. There are no existing solutions for QoS interoperability between the home network with its possible wide variety of Internal protocols and the IMS/SIP protocols that are used to setup up sessions outside the home network. In the absence of a solution, all applications running on different devices within the home network will have an equal opportunity to transmit data frames. Whilst this may be adequate for data traffic associated with applications such as web browsers, file transfers, or email, it is inadequate for multimedia applications. In particular, the quality of high speed and/or high demanding multimedia services (such as HDTV, VoIP and videoconferencing) cannot be guaranteed.

According to a first aspect of the present invention there is provided a method of ensuring an end-to-end Quality of Service for calls traversing an IP Multimedia Subsystem, the method comprising:

interposing a Home IP Multimedia Subsystem Gateway at the control plane between the IP Multimedia Subsystem and at least one non-SIP client;

at the Home IP Multimedia Subsystem Gateway, exchanging SIP signalling with a remote client on behalf of said non-SIP client, the Gateway performing a mapping between a media type identified within the SDP part of one or more SIP messages and a Quality of Service type specified for a protocol used to control the Quality of Service in the call leg between the non-SIP client and a Residential Gateway; and configuring said call leg in accordance with the mapped Quality of Service type.

In an embodiment of the invention, the method comprises selecting at the Home IP Multimedia Subsystem Gateway a mapping function appropriate for said protocol used to control the Quality of Service of a call leg between the non-SIP client and the Residential Gateway, the mapping function being selected from a plurality of mapping functions.

The Residential Gateway may be, for example, a routed gateway or a bridged gateway. The Residential Gateway may contain a UPnP Internet Gateway Device.

By way of example, the protocol used to control the Quality of Service of a call leg between the non-SIP client and the Residential Gateway may be one of; UPnP, WMM, and DiffServ.

Preferably, said step of configuring said call leg in accordance with the mapped Quality of Service type comprises configuring at least the Residential Gateway (e.g. providing an Internet Gateway Device). The Home IP Multimedia Subsystem Gateway may also configure one or more of; an Ethernet Switch, a WLAN Access Point, and IP Router. The protocol used to configure the Residential Gateway and entities in the call path between the Residential Gateway and the non-SIP client, may be the same protocol used to control the Quality of Service at the non-SIP client.

Said step of configuring said call leg in accordance with the mapped Quality of Service type may comprise using said protocol to configure a node within the call path including the Residential Gateway. This node may be a node responsible for tagging packets or frames with a priority value, for example an Internet Gateway Device, or it may be a node responsible for forwarding packets or frames based upon a priority value contained within the frame or packet.

According to a second aspect of the present invention there is provided a Home IP Multimedia Subsystem Gateway comprising:

a first interface for communicating with an IP Multimedia Subsystem;

one or more second interfaces for communicating with client terminals using a non-SIP call set-up protocol;

means for exchanging SIP signalling with a remote client on behalf of a non-SIP client via said first interface, and for performing a mapping between a media type identified within the SDP part of one or more SIP messages and a Quality of Service type specified for a protocol used over a second interface to establish a call leg between the non-SIP client and a Residential Gateway; and means for configuring said call leg in accordance with the mapped Quality of Service type.

DETAILED DESCRIPTION OF CERTAIN EMBODIMENTS

Figure 1:
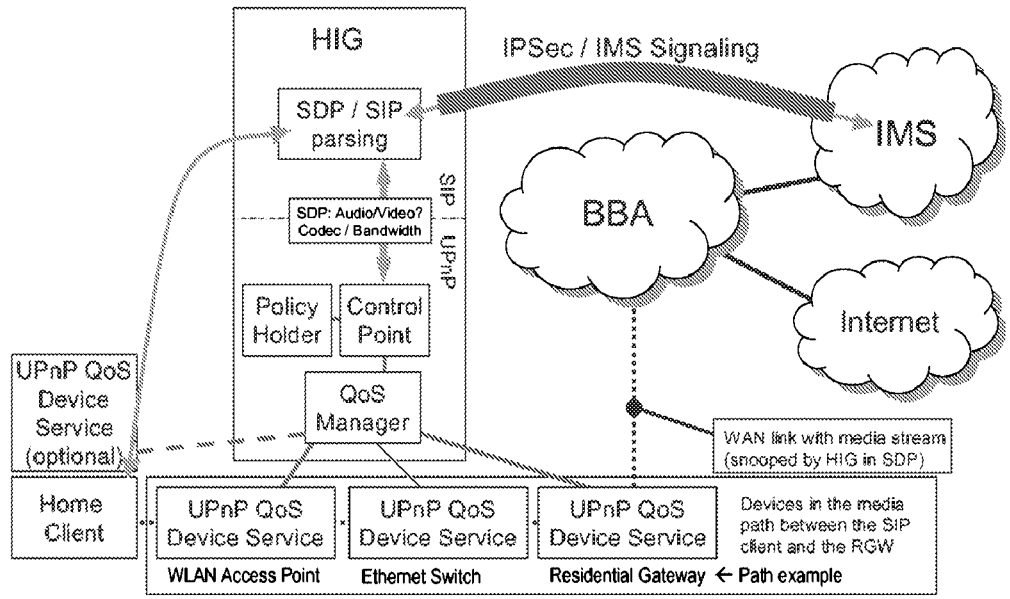
FIG. 1 illustrates schematically a Home IMS Gateway within a home network.

As has already been mentioned above, it is proposed to introduce a so-called Home IMS Gateway (HIG) into the general IMS architecture. FIG. 1 illustrates the HIG which is located in the home between the IMS and the home network (at the control level). For SIP enabled terminals, the HIG acts as a Back-to-Back User Agent, whilst for non-SIP enabled terminals the HIG provides an interface between the IMS and non-IMS world, translating between SIP and other protocols used in the home network.

In order to address the issue of QoS interoperability between the home network and the IMS, a new functionality is introduced into the HIG. From the perspective of QoS, this functionality allows the HIG to act as a traffic priority manager and QoS policyholder. It accesses the media capabilities of home devices and uses this information to negotiate QoS session parameters per IMS traffic stream. Via a QoS Manager, the HIG controls various components of the home network, e.g. a WLAN Access Point, an Ethernet Switch, and a Residential Gateway as illustrated in FIG. 1.

For non-SIP enabled terminals, within any home network different clients may use different application layer protocols to communicate with the HIG (although it can be assumed that IP is used to handle addressing, routing, etc). However, one strong candidate for future convergence is the UPnP (Universal Plug and Play) protocol. For the purpose of the following discussion, it is assumed that UPnP is used by HIG to open up the necessary ports in the residential gateway in order to accept incoming media streams and sessions.

Considering further the example of FIG. 1, the client devices (only one of which is illustrated) are assumed to also communicate with the HIG using UPnP. It is also assumed that all clients use Ethernet as the physical layer. During a call set up, the HIG initiates the QoS setup mechanism with the client. When a new session is being set-up, initiated either from the home network or from the outside world via the IMS, the HIG looks into the SDP part of SIP messages in order to understand what QoS level is needed. HIG then initiates a UPnP QoS setup from its internal UPnP Control Point to negotiate and prepare the home network part of the media path for this new session.

Typically, an IMS call is initiated by the calling party sending a SIP INVITE message to the called party. The called party then returns a 200 OK message, and the calling party acknowledges receipt of this, and closes the setup phase, by sending an ACK message. Each of these messages will contain an SDP part, and the HIG must set the media type of the SDP part in dependence upon the requirements and capabilities of the communicating parties, and configure the home network accordingly.

To establish a QoS path, the UPnP QoS Manager within the HIG requires the value of the TrafficClass variable as input along with the source and sink of the media stream. UPnP defines the following values of the TrafficClass variable: Network Control, Streaming Control, Voice, AV, Data, Audio, Images, Gaming, Other, and Background. The UPnP QoS framework [UPnP QoS architecture: 1.0, UPnP version 1.0, March 2005] specifies that the Control Point obtains the value of the TrafficClass from the stream source and this value is based on the media being streamed. The TrafficClass is passed to the UPnP QoS Manager [QoS Manager description: 1.0, UPnP version 1.0, March 2005] which interacts with the UPnP QoS Policy Holder to get the TrafficImportanceNumber. UPnP specifies the conversion of TrafficClass variable value to values of TrafficImportanceNumber as shown in Table 1 below. UPnP TrafficImportanceNumber is mapped to IEEE 802.1p traffic type values as shown in Table 1. IEEE 802.1p is the protocol used to prioritise Ethernet traffic, specifying the traffic type values for inclusion in the Ethernet frame headers. Layer 2 switches use the traffic type values to prioritise the forwarding of Ethernet frames.

Using the value of the TrafficImportanceNumber, the QoS Manager sets the layer 2 packet tagging value for the respective stream in the client acting as the source of the media. The QoS similarly sets the layer 2 packet tagging value in the Internet Gateway Device (within the residential gateway) so that incoming packets (from the IMS) are appropriately tagged. The QoS Manager also ensures that all intermediate devices along the stream path have the resources to support the required QoS level of the media stream. The TrafficClass value is extracted by the HIG parsing the SIP SDP exchanged between the home client and the IMS system. To establish a QoS path in the home network for the traffic stream of the home client, the HIG converts the SDP media type and its attributes to the UPnP TrafficClass value.

Figure 2:
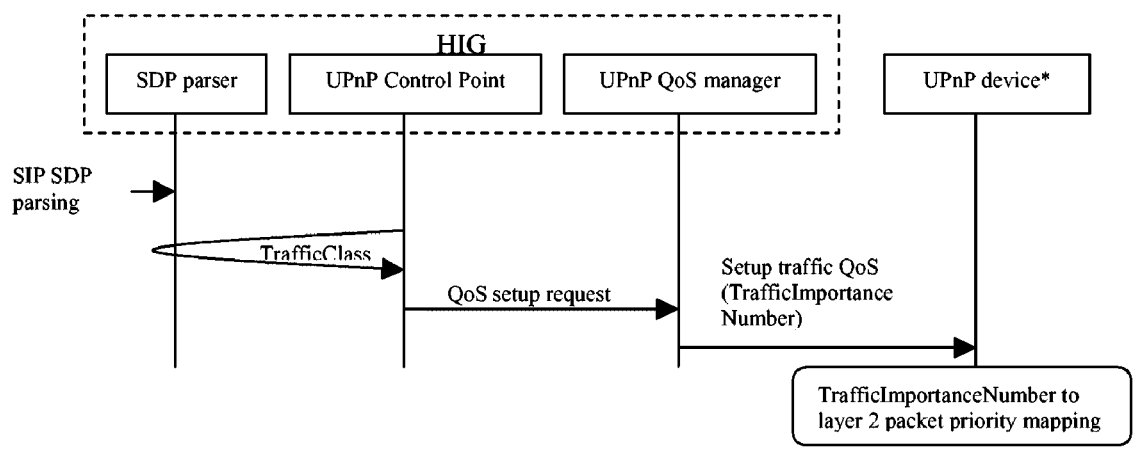
FIG. 2 illustrates an event sequence for configuring Quality of Service within a home network.

FIG. 2 shows the event sequence between the HIG and a UPnP device within the home network. Upon intercepting the SIP SDP exchanged during call session establishment, the HIG parses the message and extracts the media descriptor. As described in [RFC 2327, "SDP: Session Description Protocol"], the SIP SDP includes the media announcements. An SDP media session is described as:

m=<media><port><transport><fmt list>

The media field contains a media type subfield with values: "audio", "video", "application", "data" and "control". The HIG maps the media type field to UPnP TrafficClass variable as shown in Table 2 below.

The UPnP QoS mechanism allows for a more precise definition of the media stream than does SDP. This is reflected in the dual values to which some SDP media types can be mapped. Which traffic class variable an SDP media type is assigned to depends to depends upon how sensitive a given media stream is to time delays. For example, audio streams requiring delays of less than 10 ms will be mapped to TrafficClass 'voice', while streams with delays less that 100 ms are mapped to TrafficClass 'audio'. For the SDP media type 'application', interactive/real-time applications which are very delay sensitive (such as games) will be mapped to the 'gaming' TrafficClass, while non-interactive applications which are not so delay-sensitive are mapped to the 'data' TrafficClass. As will be apparent from Table 1, both network control and streaming control TrafficClasses are treated equally in terms of QoS, so the SDP media type 'control' can be mapped to either.

After the determination of the TrafficClass variable for an SDP media type, the Control Point in the HIG initiates the UPnP QoS setup. The UPnP QoS setup involves a series of messages exchanged between the QoS Manager and the source device, as well as with intermediate devices (all represented as UPnP devices in FIG. 1). At the end of the QoS setup, at least the source client and IGD are set to tag media stream packets with the layer 2 priority value corresponding to the TrafficImportanceNumber.

If parameterised QoS strategy is supported by UPnP as well as the media type, the HIG also extracts from the SIP SDP the bandwidth requirement for the media stream and passes this value to the QoS Manager for admission control as specified in section 7 of [QoS Manager description: 1.0, UPnP version 1.0, March 2005].

The CableHome [CableHome 1.1 Specification, version 1.1, August 2005] architecture, which enables the delivery of new cable-based services to devices within the home, relies on UPnP for its QoS mechanism. Therefore the mapping provided in table 2 is relevant for CableHome 1.1 QoS.

As already noted above, clients within the home network may use protocols other than UPnP to communicate with the HIG. Examples are as follows:

Wi-Fi Multimedia

To meet the need for QoS wireless networks, the Wi-Fi Alliance proposed WMM (Wi-Fi Multimedia) as a profile of the upcoming IEEE 802.11e QoS extensions for 802.11 networks. WMM prioritises traffic demands from different applications and extends Wi-Fi's high quality end-user experience from data connectivity to voice, music, and video applications under a wide variety of environment and traffic conditions. WMM defines four access categories that are used to prioritise traffic so that these applications have access to the necessary network resources. A mapping between these categories and those of SDP are presented in Table 4 below.

Generic IEEE 802.1p Based Protocol

The HIG QoS mapping functionality also covers the scenario where a generic protocol is used to set the IEEE 802.1p priority values in home devices. In this case, HIG acts as an intermediary between the IMS system and the home QoS management system. In a home network environment that supports traffic prioritisation based on the IEEE 802.1p standard, the mapping from SDP is carried out according to Table 5 below Non-UPnP home clients that support 802.1p are configured to tag packets with the relevant p-bits out of band with respect to UPnP. The HIG passes the p-bit value to the QoS mechanism which then sets the relevant traffic priority level.

DiffServ

In a scenario where the home network QoS is based on DiffServ, the HIG can act as an intermediary device for QoS translation for the traffic streams related to the IMS system. Table 6 illustrates the mapping table between SDP media types and DSCP (Differentiated Service Code Point). There are no standard mappings of DSCP to 802.1p; rather this is usually a vendor solution. The relation in Table 6 is a possible mapping solution.

A possible scenario is that several protocols may be used simultaneously within the home network, e.g. UPnP and WMM. In this case, the HIG must be configured to interface both UPnP and WMM to the IMS network. More particularly, the HIG must map between IMS QoS media types and those of the used home network protocols.

It will be appreciated by the person of skill in the art that various modifications may be made to the above described embodiments without departing from the scope of the present invention. For example, the client device itself may not support Quality of Service functionality. In this case, and with reference to FIG. 1, the UPnP device service is not present within the client, and it is the WLAN Access Point (in this example) which sets the Level 2 priority tag in the Ethernet frame header.

TABLE 1

| UPnP TrafficClass | UPnP TrafficImportanceNumber | IEEE 802.1p traffic type |
|---|---|---|
| Network control | 7 | NC |
| Streaming control | 7 | NC |
| Voice | 6 | VO |
| Gaming | 6 | VO |
| AV | 5 | VI |
| Audio | 5 | VI |
| Images | 3 | EE |
| Data | 0 | BE |
| Other | 0 | BE |

TABLE 2

| SDP | UPnP TrafficClass |
|---|---|
| Audio | Voice/Audio |
| Video | Av |
| Application | Data/Gaming |
| Data | Data |
| Control | Network/Streaming control |

TABLE 3

| SDP bandwidth description | UPnP bandwidth description |
|---|---|
| b = row | TSpec: Mean data rate |

TABLE 4

| SDP | WMM |
|---|---|
| Audio | Voice |
| Video | Video |
| Application | Best effort |
| Data | Background |

TABLE 5

| SIP SDP | 802.1p |
|---|---|
| Control | 7 |
| Audio | 6 |
| Video | 5 |
| Application | 3 |
| Data | 0 |

TABLE 6

| SIP SDP | DSCP | DiffServ Profile |
| --- | --- | --- |
| Control | 56 | Control |
| Audio | 46 | Expedited forwarding |
| Video | 40 | Express forwarding |
| Application | 26 | AF31 |
| Data | 0 | Best effort |

The invention claimed is:

1. A method of ensuring an end-to-end Quality of Service for calls traversing an Internet Protocol (IP) Multimedia Subsystem, the method comprising:
   interposing a Home IP Multimedia Subsystem Gateway at a control plane between the IP Multimedia Subsystem and at least one non-Session Initiation Protocol (non-SIP) client;
   mapping, by the Home IP Multimedia Subsystem Gateway, between a media type identified within a Session Description Protocol (SDP) part of one or more SIP messages exchanged via the Home IP Multimedia Subsystem Gateway and a Quality of Service type specified for a protocol used to control the Quality of Service in a call leg between the non-SIP client and a Residential Gateway; and
   configuring said call leg in accordance with the mapped Quality of Service type.

2. The method according to claim 1, further comprising selecting at the Home IP Multimedia Subsystem Gateway a mapping function appropriate for said protocol used to control the Quality of Service of a call leg between the non-SIP client and the Residential Gateway, the mapping function being selected from a plurality of mapping functions.

3. The method according to claim 1, wherein said Residential Gateway is a routed gateway.

4. The method according to claim 1, wherein said Residential Gateway contains a Universal Plug and Play (UPnP) Internet Gateway Device.

5. The method according to claim 1, wherein the protocol used to control the Quality of Service of a call leg between the non-SIP client and the Residential Gateway is one of Universal Pluq and Play (UPnP), Wi-Fi Multimedia (WMM), and Differentiated Services (DiffServ).

6. The method according to claim 1, wherein said step of configuring said call leg in accordance with the mapped Quality of Service type comprises configuring at least the Residential Gateway.

7. The method according to claim 6, wherein said step of configuring said call leg further comprises configuring one or more of an Ethernet Switch, a Wireless Local Area Network (WLAN) Access Point, and an IP Router.

8. A Home Internet Protocol (IP) Multimedia Subsystem Gateway comprising:
   a first interface for communicating with an IP Multimedia Subsystem;
   at least one second interface for communicating with client terminals using a non-Session Initiation Protocol (non-SIP) call set-up protocol;
   means for exchanging SIP signaling with a remote client on behalf of a non-SIP client via said first interface, and for performing a mapping between a media type identified within a Session Description Protocol (SDP) part of one or more SIP messages and a Quality of Service type specified for a protocol used over a second interface to establish a call leg between the non-SIP client and a Residential Gateway; and
   means for configuring said call leg in accordance with the mapped Quality of Service type.

9. The Home IP Multimedia Subsystem Gateway according to claim 8, further comprising means for selecting at the Home IP Multimedia Subsystem Gateway a mapping function appropriate for said protocol used to control the Quality of Service of a call leg between the non-SIP client and the Residential Gateway, the mapping function being selected from a plurality of mapping functions.

10. The method according to claim 1, wherein said Residential Gateway is a bridged gateway.

* * * * *

UNITED STATES PATENT AND TRADEMARK OFFICE
CERTIFICATE OF CORRECTION

| | | |
|---|---|---|
| PATENT NO. | : 7,881,338 B2 | Page 1 of 1 |
| APPLICATION NO. | : 12/090804 | |
| DATED | : February 1, 2011 | |
| INVENTOR(S) | : Damola et al. | |

It is certified that error appears in the above-identified patent and that said Letters Patent is hereby corrected as shown below:

In Column 3, Line 27, delete "OF" and insert -- OF THE --, therefor.

In Column 5, Line 53, delete "5 below" and insert -- 5 below. --, therefor.

In Column 6, Line 37, in Table 2, delete "Av" and insert -- AV --, therefor.

In Column 8, Line 2, in Claim 5, delete "Pluq" and insert -- Plug --, therefor.

Signed and Sealed this
Nineteenth Day of April, 2011

David J. Kappos
*Director of the United States Patent and Trademark Office*